(12) United States Patent
Hayter et al.

(10) Patent No.: US 11,105,610 B2
(45) Date of Patent: *Aug. 31, 2021

(54) APPARATUS AND METHOD FOR REMOTE OPTICAL CALIPER MEASUREMENT

(71) Applicant: Spectrum Global Solutions, Inc., Longwood, FL (US)

(72) Inventors: Keith William Hayter, Apopka, FL (US); Emmanuel Poulin, Orlando, FL (US); Robert William Baltar, Altamonte Springs, FL (US)

(73) Assignee: Spectrum Global Solutions, Inc., Longwood, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/918,651

(22) Filed: Jul. 1, 2020

(65) Prior Publication Data
US 2021/0025694 A1 Jan. 28, 2021

Related U.S. Application Data

(63) Continuation of application No. 15/659,350, filed on Jul. 25, 2017, now Pat. No. 10,704,895.

(51) Int. Cl.
| | |
|---|---|
| *G01B 11/14* | (2006.01) |
| *G01C 9/00* | (2006.01) |
| *B64C 39/02* | (2006.01) |
| *B64D 47/08* | (2006.01) |
| *G01B 11/02* | (2006.01) |

(Continued)

(52) U.S. Cl.
CPC ............ *G01B 11/14* (2013.01); *B64C 39/024* (2013.01); *B64D 47/08* (2013.01); *G01B 11/02* (2013.01); *G01B 11/026* (2013.01); *G01C 3/08* (2013.01); *G01C 9/005* (2013.01); *G01C 15/002* (2013.01); *G06T 7/60* (2013.01); *B64C 2201/123* (2013.01); *B64C 2201/127* (2013.01)

(58) Field of Classification Search
CPC ........ B64C 2201/123; B64C 2201/127; B64C 39/024; B64D 47/08; G01B 11/02; G01B 11/026; G01B 11/14; G01C 15/002; G01C 3/08; G01C 9/005; G06T 7/60
See application file for complete search history.

(56) References Cited

U.S. PATENT DOCUMENTS

| | | | | |
|---|---|---|---|---|
| 4,874,238 A | * | 10/1989 | Ochi | G01S 5/16 356/3.12 |
| 5,101,412 A | * | 3/1992 | Pillsbury | H01S 5/02253 372/34 |

(Continued)

FOREIGN PATENT DOCUMENTS

DE 10154978 A1 * 5/2003 ............... G01B 3/20

*Primary Examiner* — Francis Geroleo
(74) *Attorney, Agent, or Firm* — Pryor Cashman LLP

(57) ABSTRACT

An apparatus and method for performing optical caliper measurements remotely, including an unmanned aerial vehicle, a camera attached to the unmanned aerial vehicle, and an optical caliper measurement tool attached to the unmanned aerial vehicle, where the optical caliper measurement tool includes a mount, a laser source attached to the mount, and a beam splitter attached to the mount, where the laser source is configured to direct a laser beam through the beam splitter to split the laser beam into two parallel laser beams separated by a fixed distance.

16 Claims, 4 Drawing Sheets

(51) Int. Cl.
*G01C 3/08* (2006.01)
*G06T 7/60* (2017.01)
*G01C 15/00* (2006.01)

(56) References Cited

U.S. PATENT DOCUMENTS

| | | | | |
|---|---|---|---|---|
| 5,305,088 | A * | 4/1994 | Hosoe | G01B 9/02019 |
| | | | | 356/487 |
| 6,447,119 | B1 * | 9/2002 | Stewart | A61B 3/101 |
| | | | | 351/212 |
| 10,807,707 | B1 * | 10/2020 | Ter Keurs | B64D 9/00 |
| 2011/0141345 | A1 * | 6/2011 | Ramsey | H04N 5/2256 |
| | | | | 348/370 |
| 2015/0254861 | A1 * | 9/2015 | Chornenky | H04M 1/0264 |
| | | | | 348/135 |
| 2017/0178222 | A1 * | 6/2017 | High | G01N 33/24 |
| 2020/0036896 | A1 * | 1/2020 | Kalinowski | H04N 5/23258 |

* cited by examiner

APPARATUS AND METHOD FOR REMOTE OPTICAL CALIPER MEASUREMENT

CROSS-REFERENCE TO RELATED APPLICATIONS

This application is a continuation of U.S. application Ser. No. 15/659,350, titled "Apparatus and Method for Remote Optical Caliper Measurement," filed on Jul. 25, 2017, which is herein incorporated by reference.

TECHNICAL FIELD

The present invention relates to an apparatus and method for performing optical caliper measurements remotely. In particular, the present invention relates to an unmanned aerial vehicle (UAV), or drone, having laser-based optical caliper measurement aspects.

BACKGROUND OF THE INVENTION

At the present time, there are over 118,700 telecommunication towers in the United States. This figure only accounts for towers owned by domestic companies, excluding those towers owned by the government, military, or foreign entities. In addition to telecommunication towers, antennas and mounts are also installed on buildings, water towers, grain silos, smoke stacks, and other structures that provide the requisite elevation for propagating radio frequency (RF) or microwave (MW) signals. Commercial cellular towers typically range from 80 to 400 feet above ground level (AGL) in height, but have been known to be as short as 20 feet or as tall as 1,800 feet.

In order to obtain the required information for a structural analysis report, a measurement crew is traditionally employed to climb the tower with their measurement and recordation equipment.

Each structural element, e.g., angles, pipes, and bolts, would be physically measured with the results being subsequently recorded. This measurement technique has several apparent deficiencies. The first deficiency relates to safety. This technique constitutes a high-risk work activity, ranked by industry watchdogs and the Occupational Safety and Health Administration (OSHA) as having the highest, or at a minimum within the top four highest, construction-based fatalities per 100,000 workers. Moreover, climbing crews are at risk for exposure to RF radiation and, therefore, there is a need to monitor RF exposure. The second deficiency relates to cost. Costs may include labor, training, equipment, climbing and safety certifications, infrastructure or equipment damage repairs or replacements, liability insurance, and workers' compensation. Finally, there may be compliance issues, such as relating to non-disturbance of endangered or protected wildlife species.

Currently-available non-physical solutions for mapping and measuring via optical or non-optical means cannot produce accuracies of less than 1.5 inches or 3 to 4 cm. Therefore, there exists a need for effective means to make the above-described measurements in a safe and more cost-effective manner while also achieving superior accuracy.

SUMMARY OF THE INVENTION

In general, in one aspect, the invention features an apparatus for performing optical caliper measurements remotely, including an unmanned aerial vehicle, a camera attached to the unmanned aerial vehicle, and an optical caliper measurement tool attached to the unmanned aerial vehicle, where the optical caliper measurement tool includes a mount, a laser source attached to the mount, and a beam splitter attached to the mount, where the laser source is configured to direct a laser beam through the beam splitter to split the laser beam into two parallel laser beams separated by a fixed distance.

Implementations of the invention may include one or more of the following features. The camera may have photographic or videographic capabilities with a resolution of 4K or greater. The apparatus may further include a level attached to the mount. The apparatus may further include a laser distance finder attached to the unmanned aerial vehicle or the optical caliper measurement tool. The beam splitter may include fused silica or BK7. A beam splitter housing for housing the beam splitter may be disposed between the beam splitter and the mount, and the beam splitter housing may include a thermoplastic plate. The beam splitter may be rotatable with respect to the mount. The fixed distance between the two parallel laser beams may be approximately 20 mm to approximately 40 mm.

In general, in another aspect, the invention features a method for performing optical caliper measurements remotely, including attaching an optical caliper measurement tool to an unmanned aerial vehicle including a camera, and performing an optical caliper measurement by the optical caliper measurement tool, where the optical caliper measurement tool includes a mount, a laser source attached to the mount, and a beam splitter attached to the mount, where the laser source directs a laser beam through the beam splitter to split the laser beam into two parallel laser beams separated by a fixed distance.

Implementations of the invention may include one or more of the following features. The camera may have photographic or videographic capabilities with a resolution of 4K or greater. A level may be attached to the mount. A laser distance finder may be attached to the unmanned aerial vehicle or the optical caliper measurement tool. The beam splitter may include fused silica or BK7. A beam splitter housing for housing the beam splitter may be disposed between the beam splitter and the mount, and the beam splitter housing may include a thermoplastic plate. The beam splitter may be rotatable with respect to the mount. The fixed distance between the two parallel laser beams may be approximately 20 mm to approximately 40 mm.

DETAILED DESCRIPTION OF THE INVENTION

Figure 1:
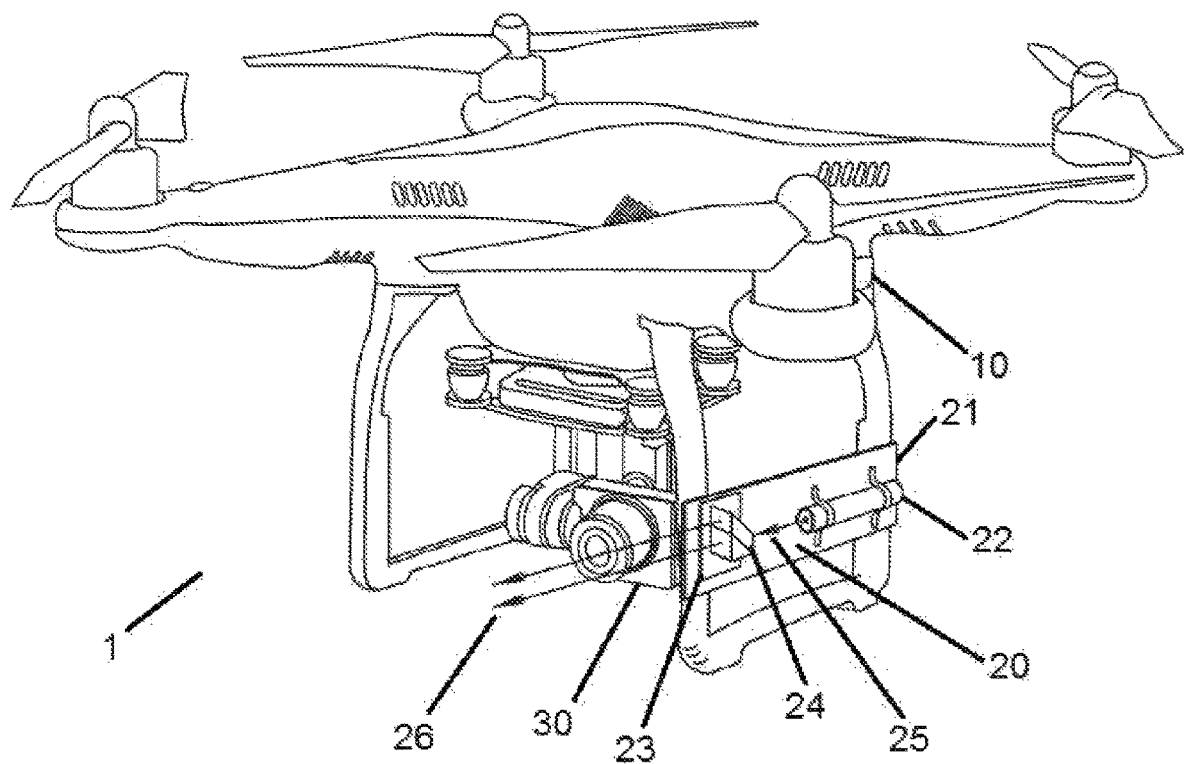
FIG. 1 shows a remote optical caliper measurement apparatus of an embodiment of the present invention.

FIG. 1 illustrates a remote optical caliper measurement apparatus of an embodiment of the present invention. Remote optical caliper measurement apparatus 1 includes a UAV 10, an optical caliper measurement tool 20, and a camera 30.

UAV 10 may be any UAV or drone capable of securing a camera and an optical caliper measurement tool of the present invention without resulting in permanently unbalanced flight abilities. Additionally, in a preferred embodiment, UAV 10 may be self-stabilizing, such that when a flight imbalance is detected by UAV 10, UAV 10 may correct the imbalance to level the flight of the apparatus of the present invention. This may be accomplished by adjusting the propeller speed of UAV 10 to account for and remedy the imbalance.

Optical caliper measurement tool 20 may be mounted to any location of UAV 10 that does not result in permanently unbalanced flight abilities of the apparatus of the present invention. Additionally, optical caliper measurement tool 20 may be mounted by any acceptable mounting means that again does not result in permanently unbalanced flight abilities of the apparatus of the present invention. Optical caliper measurement tool 20 may be removably attached to UAV 10 and, therefore, capable of use both with and without UAV 10.

Figure 2:
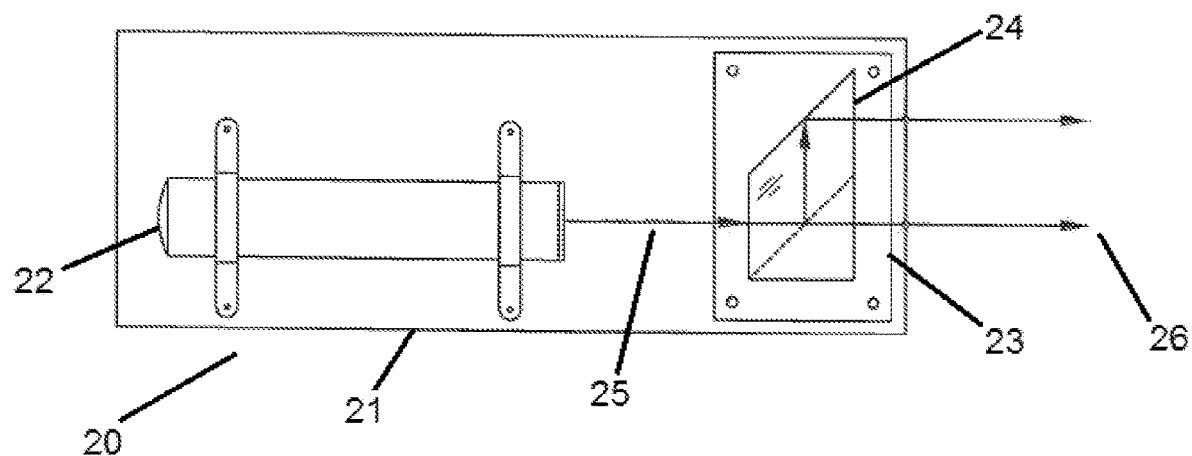
FIG. 2 shows an optical caliper measurement tool of an embodiment of the present invention.

As illustrated in FIG. 1 and with greater detail in FIG. 2, optical caliper measurement tool 20 includes a tool mount 21, a laser source 22, a beam splitter housing 23, and a beam splitter 24. When mounting optical caliper measurement tool 20 to UAV 10, tool mount 21 may be in contact with UAV 10. Tool mount 21 may be composed of plywood, lightweight non-ferrous materials, or the like. The thickness of tool mount 21 may be any acceptable thickness. In a preferred embodiment, the thickness of tool mount 21 is ¼ inch.

Laser source 22 and beam splitter housing 23 may be mounted to tool mount 21. Laser source 22 may be a high power laser source. In a preferred embodiment, laser source 22 may produce a laser beam having an intensity of approximately 30 mW or greater, and a final intensity of approximately 50% of the original laser source per split beam. A laser source producing a laser beam having an intensity of greater than 35 mW may negatively affect a film utilized in certain beam splitters, including beam splitter 24. Laser source 22 may produce a laser based in the visible light spectrum, the infrared spectrum, or the ultraviolet spectrum. Laser source 22 may produce a visible, colored laser beam, including a green laser beam, such that the laser beam is more easily visible in a bright environment. Beam splitter 24 may be mounted to beam splitter housing 23.

Beam splitter housing 23 may be composed of a thermoplastic material and/or take the form of a plate. Beam splitter housing 23 in the form of a thermoplastic plate may enhance the ability of beam splitter 24 to rotate. Beam splitter 24 may be composed of any material acceptable in splitting a beam, such as beam 25, into at least two parallel beams, such as beams 26, having a fixed distance between the parallel beams. Beam splitter 24 may be a lateral displacement beam splitter (LDBS). Examples of acceptable materials that may compose beam splitter 24 include fused silica, BK7, and the like. The fixed distance between parallel beams, such as beams 26, may be any acceptable distance, with the fixed distance depending upon physical characteristics of the selected beam splitter. In preferred embodiments, this fixed distance is 20 mm to 40 mm. The present invention provides for a fixed distance between parallel beams regardless of distance between apparatus 1 and the measured object.

Figure 3:
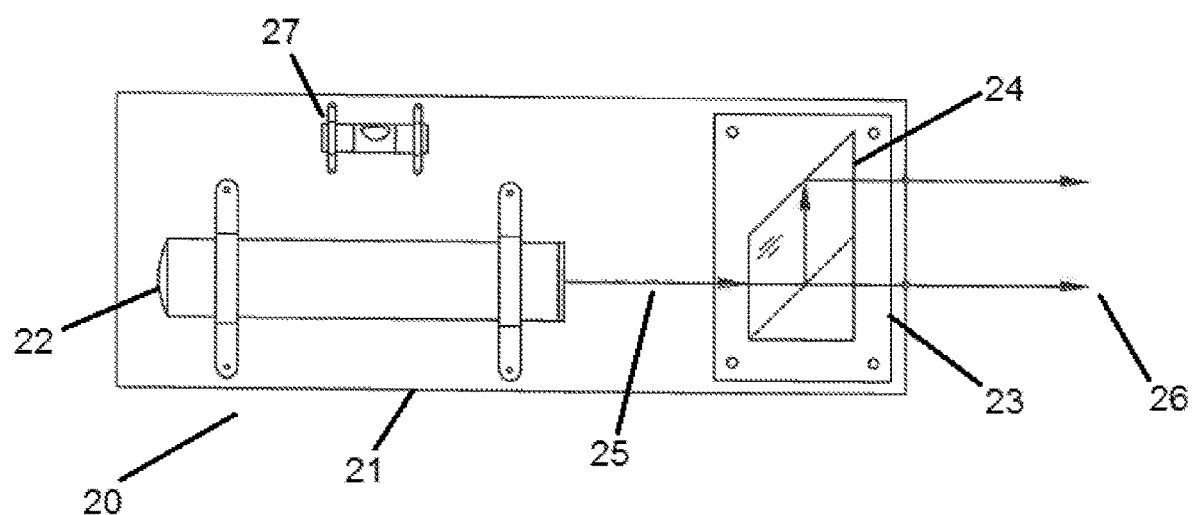
FIG. 3 shows an optical caliper measurement tool of another embodiment of the present invention.

In another embodiment of the present invention, as illustrated by FIG. 3, a level 27 may also be mounted to tool mount 21 of optical caliper measurement tool 20. Level 27 may serve to confirm level attachment of optical caliper measurement tool 20 to UAV 10, level flight ability of apparatus 1 or UAV 10, level usage of optical caliper measurement tool 20 when not attached to UAV 10, and the like. Level 27 may be mounted to any acceptable location of tool mount 21 as long as it does not interfere with optical caliper measurements and/or UAV flight abilities.

Camera 30 may be mounted to any acceptable location of UAV 10. In a preferred embodiment, camera 30 is mounted to UAV 10, such that camera 30 is pointed in the same direction as laser source 22 and consequently beams 25 and 26. Camera 30 is capable of capturing an image in which the parallel laser beams separated by a fixed distance are projected onto a structure to create an optically recognizable caliper measurement on the structure. Camera 30 may have photographic capabilities, videographic capabilities, or both. Camera 30 may produce high-resolution photographs or videos. Such resolution may be 4K or greater. Images captured by camera 30 may be stored on the camera or wirelessly transmitted to a remote processor.

Figure 4:
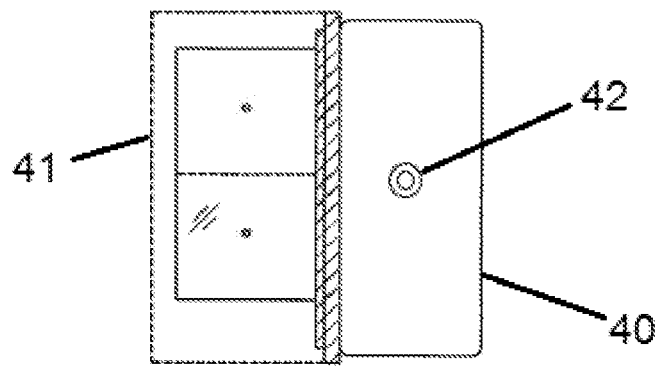
FIG. 4 shows a laser distance finder of an embodiment of the present invention.

In another embodiment of the present invention, as illustrated by FIG. 4, a laser distance finder 40 may be also be mounted to or adjacent to remote optical caliper measurement apparatus 1 at any acceptable location, including tool mount 21 of optical caliper measurement tool 20. In a preferred embodiment, laser distance finder 40 includes a protractor or an equivalent element. At least a portion of laser distance finder 40 may be enclosed in a polymer-based enclosure 41. An aperture 42 may be included in laser distance finder 40.

Through usage of the apparatus of the present invention, it is possible to provide a mapping and/or inspection method having an accuracy of greater than ¹⁄₁₆ inch or 2 mm.

It will be understood by those of ordinary skill in the art that various changes may be made and equivalents may be substituted for elements without departing from the scope of the invention. In addition, many modifications may be made to adapt a particular feature or material to the teachings of the invention without departing from the scope thereof. Therefore, it is intended that the invention not be limited to the particular embodiments disclosed, but that the invention will include all embodiments falling within the scope of the claims.

What is claimed is:

1. An apparatus for performing optical caliper measurements remotely, comprising:
    an aircraft including a landing gear for supporting the aircraft for takeoff and landing, the landing gear including a first landing structure and a second landing structure that are spaced apart from each other; and
    an optical caliper measurement tool attached to the aircraft, the optical caliper measurement tool comprising:
        a mount;
        a laser source connected to the mount, the laser source being configured to emit a laser beam; and
        a beam splitter connected to the mount, the beam splitter being rotatable with respect to the mount and being configured to split the laser beam emitted by the laser source into a plurality of parallel laser beams,
    wherein the mount includes a first side having the laser source and the beam splitter connected thereon and a second side connected to the first landing structure or the second landing structure.

2. The apparatus according to claim 1, further comprising:
    a camera connected to the aircraft, the camera having photographic or videographic capabilities.

3. The apparatus according to claim 1, wherein each of the first landing structure and second landing structure includes a pair of legs joined to a skid.

4. The apparatus according to claim 1, wherein the aircraft is self-stabilizing, such that when the aircraft detects a flight imbalance the aircraft self-stabilizes to correct the imbalance to level itself.

5. The apparatus according to claim 4, wherein the aircraft includes one or more propellers to allow the aircraft to fly.

6. The apparatus according to claim 5, wherein the aircraft self-stabilizes by adjusting propeller speed of each of the one or more propellers to account for and remedy the imbalance.

7. The apparatus according to claim 4, wherein, when the optical caliper measurement tool is connected to the aircraft in a manner that results in a correctable imbalance of the aircraft, the aircraft self-stabilizes to account for and remedy the imbalance.

8. The apparatus according to claim 1, wherein the laser source produces a laser beam having an intensity of approximately 30 mW or greater.

9. A method for performing optical caliper measurement remotely, comprising:
   connecting an optical caliper measurement tool to an aircraft that includes a landing gear for supporting the aircraft for takeoff and landing, the landing gear including a first landing structure and a second landing structure that are spaced apart from each other;
   performing an optical caliper measurement by the optical caliper measurement tool;
   wherein the optical caliper measurement tool comprises:
      a mount;
      a laser source connected to the mount, the laser source being configured to emit a laser beam; and
      a beam splitter connected to the mount, the beam splitter being rotatable with respect to the mount and being configured to split the laser beam emitted by the laser source into a plurality of parallel laser beams,
      wherein the mount includes a first side having the laser source and the beam splitter connected thereon and a second side connected to the first landing structure or the second landing structure.

10. The method according to claim 9, wherein the aircraft includes a camera connected to the aircraft, the camera having photographic or video graphic capabilities.

11. The method according to claim 9, wherein each of the first landing structure and second landing structure includes a pair of legs joined to a skid.

12. The method according to claim 9, wherein the aircraft is self-stabilizing, such that when the aircraft detects a flight imbalance, the aircraft self-stabilizes to correct the imbalance to level itself.

13. The method according to claim 12, wherein the aircraft includes one or more propellers to allow the aircraft to fly.

14. The method according to claim 13, wherein the aircraft self-stabilizes by adjusting propeller speed of each of the one or more propellers to account for and remedy the imbalance.

15. The method according to claim 12, wherein, when the optical caliper measurement tool is connected to the aircraft in a manner that results in a correctable imbalance of the aircraft, the aircraft self-stabilizes to account for and remedy the imbalance.

16. The method according to claim 9, wherein the laser source produces a laser beam having an intensity of approximately 30 mW or greater.

\* \* \* \* \*